United States Patent
Bierce et al.

(10) Patent No.: US 6,173,856 B1
(45) Date of Patent: Jan. 16, 2001

(54) SPILL CONTAINMENT PAN

(75) Inventors: Laurence M. Bierce, Macclenny; J. Tad Heyman, Atlantic Beach; Mark D. Shaw, Ponte Vedra Bch., all of FL (US)

(73) Assignee: UltraTech International, Inc., Jacksonville, FL (US)

( * ) Notice: Under 35 U.S.C. 154(b), the term of this patent shall be extended for 0 days.

(21) Appl. No.: 09/552,768

(22) Filed: Apr. 20, 2000

(51) Int. Cl.$^7$ .................................................. B65D 39/00
(52) U.S. Cl. .......................... 220/573; 184/106; 137/312
(58) Field of Search .................................. 220/571, 573; 137/312; 141/231

(56) References Cited

U.S. PATENT DOCUMENTS

| | | | |
|---|---|---|---|
| D. 263,055 | * 2/1982 | Penny et al. | 220/573 |
| 5,435,458 | * 7/1995 | Bishop | 220/573 |
| 5,478,625 | * 12/1995 | Wright | 220/573 |
| 5,492,158 | 2/1996 | Haaq . | |
| 5,775,869 | 7/1998 | Bishop . | |
| 5,816,743 | * 10/1998 | Schmitz, Jr. | 220/573 |
| 5,975,332 | * 11/1999 | Bishop | 220/571 |
| 5,988,427 | * 11/1999 | Moore . | |

* cited by examiner

*Primary Examiner*—Joseph M. Moy
(74) *Attorney, Agent, or Firm*—Thomas C. Saitta

(57) ABSTRACT

A liquid containment device for capturing and retaining any liquid falling into the device, such as from a leak, spill or run-off of another liquid container, where the device is designed to fit between the parallel rails of a railroad track with a railroad car positioned above, comprising a generally rectilinear pan or tray and a removable cover which directs rain water into a drain opening which corresponds to an apertured drain column rising from the bottom of the pan, such that with the cover in place rain water is directed into the drain column and passed underneath the pan rather than into the pan itself. Multiple pans may be connected in line through connector fittings in their end walls, or drain conduits may be connected to the fittings for removal of the liquid from the pan. Apertured grating members and absorbent mats may be placed within the pans. The pans may be used in conjunction with lateral pans positioned on the outside of the rails.

28 Claims, 2 Drawing Sheets

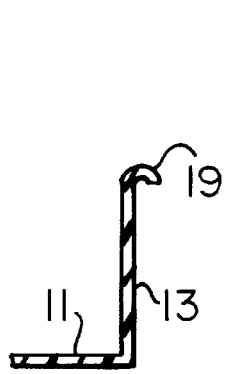
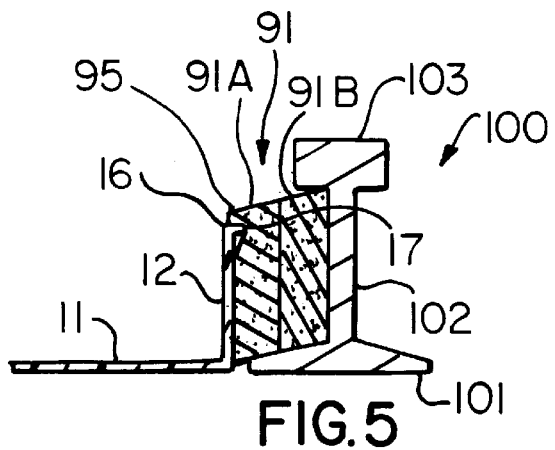
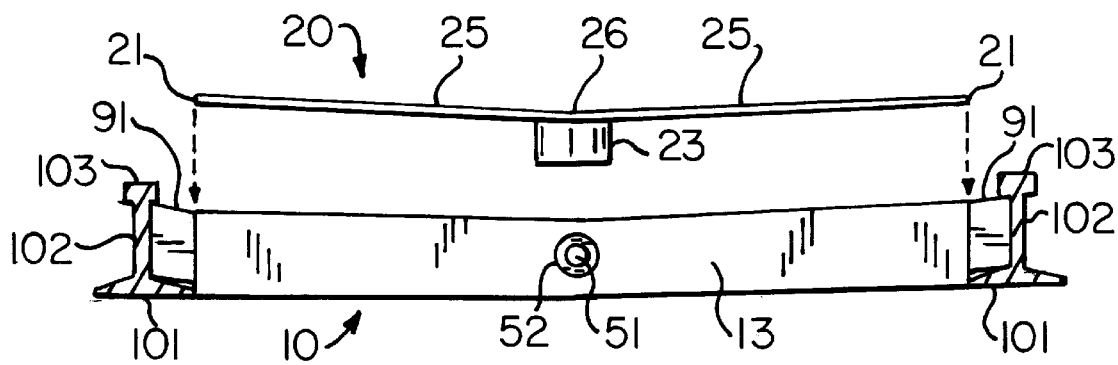
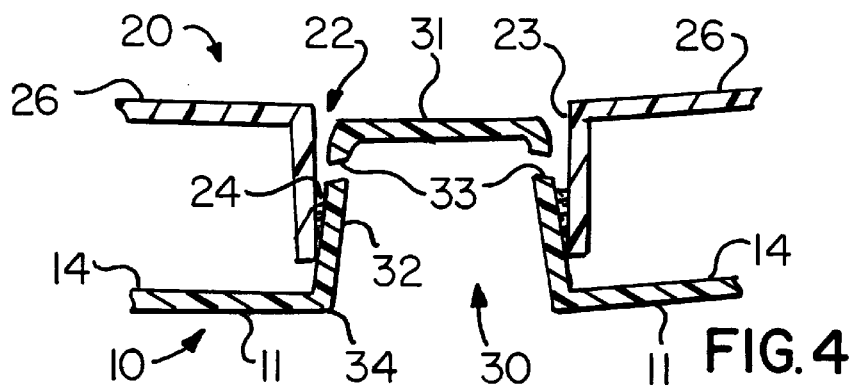

SPILL CONTAINMENT PAN

BACKGROUND OF THE INVENTION

This invention relates generally to the field of capture or containment devices used to capture and retain liquids, particularly leaks or spills from other containers, where the capture device is provided with a removable cover when not in use. More particularly, the invention relates to such devices which are primarily designed for outdoor use, where the cover is used to prevent rain water from entering the capture device. Even more particularly, the invention relates to such devices which are designed for placement in the center of a railroad track to capture liquids falling from railroad cars positioned above the devices.

It is often desirable to provide a liquid containment device beneath liquid containers or beneath areas where liquids are being sprayed or used, so that any liquid, whether from spills, leaks, run-offs or the like, is captured and retained by the containment device rather than allowing it to fall onto the floor or ground. This is especially desirable when the liquid is environmentally hazardous to the extent that non-containment can result in contaminated soil or water supplies, hazardous conditions for people or animals, etc. One such situation where it is most desirable to capture liquid leaks or spills to prevent ground contamination and fouling are railroad transfer stations, such as a rail siding where tanker cars are loaded, unloaded or cleaned.

A known solution is to provide a generally rectangular capture tray or pan which is sized to fit between the parallel rails making up a single track, the tray having short vertical side walls. Because the tray will capture hazardous materials such as chemicals, oil, grease, etc., the tray is preferably provided with a removable or translatable cover to prevent rain water from entering the tray when the tray is not in use. This precludes the possibility of a heavy rainfall amount filling the tray to reduce the available volume of the pan and ultimately washing over the side walls, which would disperse any hazardous liquids into the environment. Examples of such devices can be seen in U.S. Pat. No. 4,651,887 to Patrick, U.S. Pat. No. 5,435,458 to Bishop, U.S. Pat. No. 5,492,158 to Haag and U.S. Pat. No. 5,775,869 to Bishop. The Patrick patent shows a rectangular structure having a centrally located drain and a hinged drain surface, the surface being made of two planar members joined along the center line by a hinge. The surface can be disposed above the horizontal such that the two members define an elevated ridge line or peak, in which case liquid such as rain water will be directed over the side walls, or the surface may be disposed below the horizontal such that the two members define an inwardly sloping configuration such that hazardous liquid will be directed into the drain. The Bishop '458 patent shows a system comprising a central rectangular capture tray positioned between the rails, the central tray having a peaked cover, i.e., sloping to either side from a central elevated ridge line, which is translated in the direction parallel to the rails to uncover the central tray for use. Exterior rectangular trays are positioned to the outside of each rail, the exterior trays having a pair of hinged covers which provide a peaked central ridge line in the closed configuration. One of the hinged covers opens to cover rail area adjacent the exterior tray and the other opens outward, such that liquids which fall onto the opened covers are directed into the exterior trays. When the trays are not in use and the covers are in place, rain water is directed to the sides of the trays. The Haag patent discloses a system of rectangular trays which utilize absorbent pads retained within and overlapping adjoining trays. Haag does not discuss the use of covers. The Bishop '869 patent shows a central tray positioned between the rails with a pair of hinged covers showing a peaked central ridge in the closed configuration, where the covers open outward to extend beyond the rails laterally to capture and direct liquids into the tray. The tray has a stepped configuration such that its side edges are seated on top of the rails themselves. This device cannot be left in place between uses, since the device overrides the rails and prevents movement of the rail cars. Instead the device must be placed by fork lift under a rail car after it is moved into position and must be removed by a fork lift before the rail car can be removed. A problem with the Bishop '458 device is that the rail car must be correctly positioned relative to the trays so that the wheels do not interfere with the opening of the covers, which can only be accomplished after the rail car is in place as the covers overlie the rails. The main problem with the Patrick device is that the top of the drain surface will quickly become covered in oil, grease or other hazardous chemicals, which will be washed from the surface into the environment with each rainfall.

It is an object of this invention to provide a capture or containment pan or tray device which collects liquids falling from above the pan to prevent environmental damage, where the tray is provided with a removable cover having an inverted or valley configuration such that the cover directs rain water into a centrally located drain which directs the water beneath the pan. It is a further object to provide such a device where the side walls of the pan do not interfere with the movement of rail cars when the device is positioned between the parallel rails of a railroad track, such that sealing gasket members can be placed between the side walls of the pan and the rails themselves to preclude passage of liquid between the rails and the pan. It is a further object to provide such a device where the covers can be removed or replaced with a rail car located above the pan. It is a further object to provide such a device with internal grating so that workers can stand or walk over the pan and cover without contacting the liquid retained in the pan. It is a further object to provide connector fittings or conduits in the side walls of the pan so that adjoining pans can be connected in a liquid communicating manner so that liquid is able to flow from one pan to the next, or to allow for connection of removal conduits to pump or direct the liquid from the pan. These and other objects not expressly set forth will become obvious after review of the accompanying disclosure.

SUMMARY OF THE INVENTION

The invention is in general a liquid containment device or system adapted for capturing and retaining any liquid falling into the device, such as from a leak, spill or run-off of another liquid container, tanker or tank. In particular, the device is best adapted for use in collecting leaks, spills or run-off from railroad tanker cars and the like, where the device is designed to fit between the parallel rails of a railroad track with a railroad car positioned above it. The invention comprises in general a generally rectilinear pan or tray having opposing side walls which align with the rails and a removable cover which directs rain water into a drain opening which corresponds to an apertured drain column rising from the bottom of the pan, such that with the cover in place rain water is directed into the drain column and passed underneath the pan rather than into the pan itself. Compressible gasket members are used to fill the gap between the side walls and the rails. Multiple pans may be connected in line through connector fittings in their end walls, or drain conduits may be connected to the fittings for removal of the liquid from the pan. Apertured grating members and absorbent mats may be placed within the pans. The pans may be used in conjunction with lateral pans positioned on the outside of the rails.

BRIEF DESCRIPTION OF THE DRAWINGS

FIG. 3 is an end view with the cover raised from the pan.

FIG. 4 is a partial cross-sectional view taken laterally through the drain column.

FIG. 5 is a partial cross-sectional view taken laterally through the pan side wall, gasket and one rail.

FIG. 6 is a partial cross-sectional view taken longitudinally through the pan end wall showing the mating lip.

DETAILED DESCRIPTION OF THE INVENTION

Figure 1:
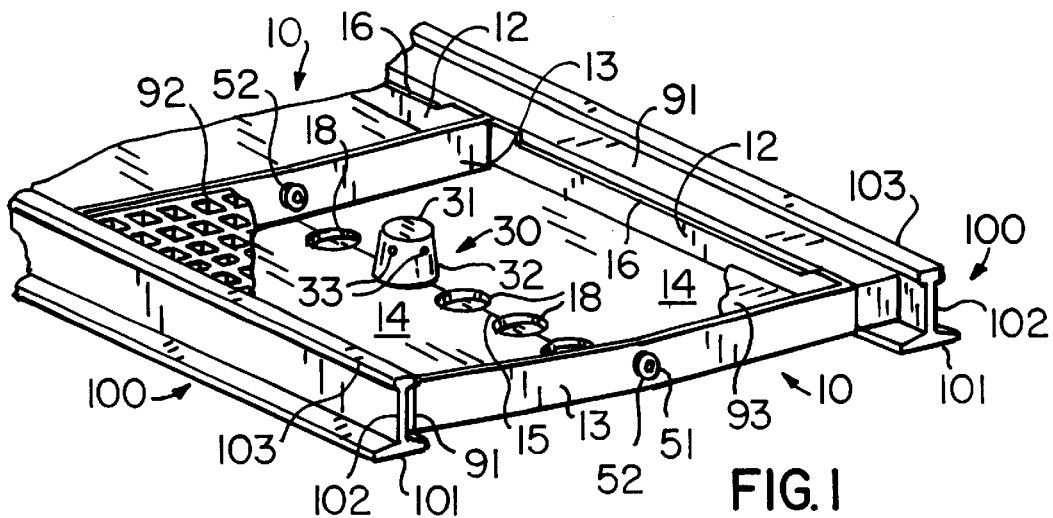
FIG. 1 is a perspective view of the invention positioned between two rails with the cover removed, shown as connected to another similar device, and with a grating or decking member and an absorbent mat member shown in partial view.

With reference to the drawings, the invention will now be described in detail with regard for the best mode and the preferred embodiment. In a general description, the invention is a liquid containment device for capturing and retaining liquids, with the liquids to be captured are referred to herein as hazardous liquids to distinguish them from rain water. Hazardous liquids include chemicals, oils, grease, fuels, contaminated water, polluted water or any other liquid which should not be allowed to flow to the ground. The invention comprises a generally rectilinear pan or tray member 10 and a removable cover member 20, where the pan 10 is primarily adapted to be positionable between the parallel rails 100 of a railroad track. With the cover 20 removed, any hazardous liquid falling into the pan 10 is retained for subsequent disposal. When not in use, the cover 20 is placed onto the pan 10. The cover 20 prevents rain water from entering the pan 10, instead directing it into a drain column 30 which conducts the water underneath the pan 10 and into the ground.

Figure 2:
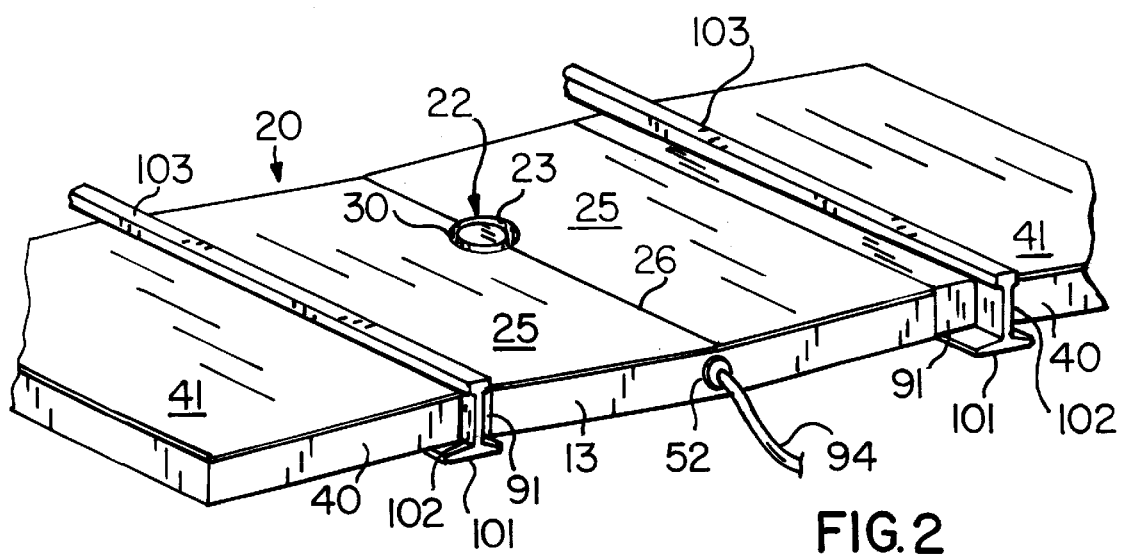
FIG. 2 is a perspective view similar to FIG. 1 but shown with the cover in place to direct rain water into the drain column, also here illustrating lateral pans and a conduit joined to the connector fitting.

As shown in FIGS. 1 through 3, the invention is primarily designed for use with railroad cars, the invention being sized to fit between a pair of rails 100. The rails 100 are comprised of a base member 101, a vertical member 102 and a top member 103, such that the rails 100 have a generally I-shaped configuration. The wheels of the rail cars rest on the top member 103 with the wheel flange abutting the interior side of the top member 103. The invention is designed so that it does not interfere with or overlay the top members 103 such that movement of rail cars over the invention is not impeded, with or without the cover 20 in place. Furthermore, the invention is designed such that the cover 20 can be removed from the pan 10 even with a rail car stationed above it. While described herein with reference to use in a railway setting, it is understood that the invention can be utilized for other applications requiring liquid retention. The invention is preferably constructed of a rugged, chemical resistant, polymer material, such as polyethylene, to keep the weight of the pan 10 and cover 20 relatively light so that they can be easily lifted and handled without the need for mechanized equipment such as a forklift, although construction from metal or other materials is possible.

The pan member 10 comprises a generally rectangular or square bottom member 11 with a pair of opposing side walls 12 and a pair of opposing end walls 13, all combined to define an interior liquid containment area. The bottom 11 may be relatively flat, but is preferably provided with at least one sloping surface 14 to cause the hazardous liquid to pool at a low point or area. As shown in FIG. 1, the bottom 11 comprises a pair of sloping surfaces 14 descending toward and meeting along a lowermost center line 15 which extends between the end walls 13. Alternatively, the lowermost area could be disposed at any location on the bottom 11. The side walls and end walls 13 are preferably no more than about six inches in height so that they do not extend above the height of the top member 103. A rail gasket member 91 of compressible material is positioned between or affixed to the side wall 12 and the vertical member 102. The rail gasket members 91 are longitudinally extensive members preferably composed of a closed cell foam material. The rail gaskets 91 are sealing members which insure that no hazardous liquids passes between the rails 100 and the pan 10. As shown in FIGS. 1 and 5, the side walls 12 are each preferably provided with a longitudinal recess 16 extending over the majority of the length of the side wall 12, such that the height of the side wall 12 is shortened in the area of the recess 16. This allows hazardous liquid which falls onto the gasket member 91 to drain across the recess and into the pan 10. Preferably, the gasket member 91 is provided with an inward sloping upper surface, and most preferably the gasket member 91 is composed of an exterior member 91b which abuts the rail 100 and an interior member 91a which abuts the side wall 12. By composing the gasket member 91 from two components, insertion between the rail 100 and the side wall 12 with the pan 11 in place is made much simpler because of the reduced thickness of each member 91a and 91b. Most preferably, the recess 16 in side wall 12 is provided with an external lip 17 which presses into the body of interior member 91a, and interior member 91a is most preferably formed with an interior shoulder which rests in recess 16. This design is best suited for preventing loss of hazardous liquids between the rails 100 and the side walls 12 of the pan 11. Gasket members 91 of compressible material are required to accommodate the wheel flanges on the rail cars.

A drain column 30 extends upwardly from the bottom 11 of the pan 10, as shown in FIGS. 1 and 4. The drain column 30 is preferably centered between the side walls 12, but may be located at any point on the bottom 11. The drain column 30 is preferably circular in horizontal cross-section, and comprises a flat or convex top member 31 and a sloping wall member 32 defining an interior with an open bottom 34, such that the overall configuration of the drain column 30 is that of a truncated cone. One or more, and preferably multiple, apertures 33 are positioned in the upper portion of the wall member 32. These apertures 33 allow rain water to pass through the open bottom 34 of drain column 33 to be conducted beneath the bottom 11 of the pan 10 when the cover 20 is in place. The apertures are most preferably slanted upward in the direction toward the interior of the drain column 30 so that any hazardous liquid which falls onto the top 31 or wall 32 of the drain column 30 when the cover 20 is removed will flow down into the bottom 11 of the pan 10 rather than through the apertures 33 and onto the ground. Placement of the apertures 33 near the top 31 of the drain column 30 allows a large volume of hazardous liquid to be retained by the pan 10 before the chance of overflow can occur. To further prevent accidental loss of hazardous liquid, absorbent mat members 93 can be placed into the pan 10, the mats 93 being removed and replaced when saturated. Additionally, apertured grating or deck members 92 can be placed into the pan 10 to provide sufficient support such that the grating 92 or the cover 20 can be walked upon. To increase the safety factor, the bottom 11 of the pan 10 may also be provided with a non-slip or non-skid surface for better traction.

In a more preferred embodiment, the pans 10 are provided with one or more lateral openings 51 and connector or bulkhead fittings 52 positioned in the end walls 13, preferably below the level of the apertures 33 in the drain column 30. This allows multiple pans 10 to be connected in line, as shown in FIG. 1, such that excessive hazardous liquid in one pan 10 can flow through the connector fittings 52 to adjacent pans 10, thereby greatly reducing the likelihood of overflow from a single pan 10. For this modular system, one of the end walls 13 of the pan 10 is provided with a mating lip 19, as shown in FIG. 6, such that hazardous liquid is precluded from passing between adjoining pans 10. Furthermore, conduit members 94, such as a pumping hose, can be connected to the connector fitting 52 to drain the pan 10, as shown in FIG. 2. When not connected to the fittings 52 of another pan 10, the lateral opening 52 if present is plugged or sealed in suitable manner. Alternatively, connector fittings 52 can be positioned in the bottom 11 of the pan 10 where in-ground conduits or sumps are present or desired. To accommodate the fittings 52 in the bottom 11 of the pan 10, at least one and preferably multiple circular depressions 18 are provided to define a low point. The provision of multiple depressions 18 provides alternative sites such that at least one depression 18 will be accessible between the railroad ties underlying the pan 10.

The cover 20 is illustrated in FIGS. 2, 3 and 4, and is preferably formed as a unitary member comprising a pair of opposing side edges 21 and at least one sloping surface 25, but preferably two sloping surfaces 25 which meet at a valley or center line 26, where the center line extends parallel to the side edges 21. The cover 20 extends across the pan 10 and preferably fits generally flush atop the side walls 12 and end walls 13. The side edges 21 of the cover 20 are relatively thin and abut the gasket members 91 when in use. Mechanical interlocks such as flanges, lugs or posts, not shown, may be incorporated in the cover 20 to secure the cover 20 to the side and end walls 12 and 13, or to deck members 92 if present, to prevent undesired lateral movement of the cover 20. The one or more sloping surfaces 25 direct rain water toward and into a drain opening 22 defined by a depending annular spout member 23. The spout 23 is open on the bottom and corresponds in location and configuration to the location and configuration of the drain column 30 of the pan 10, such that with the cover 20 properly positioned on the pan 10 the spout 23 mates with the wall 32 of said drain column 30 to form a sealed junction to force rain water to flow into the apertures 33. Preferably, the interior of the spout 23 is provided with an annular sealing or gasket member 24 made of a compressible material to better preclude passage of water into the pan 10, as seen in FIG. 4. Rain water strikes the cover 20 and is directed by the inward sloping surfaces 25 to the drain opening 22 and into the spout 23, where the sealed junction with the sloping wall 32 of the drain column 30 causes the water to flow through the apertures 33 and directly to the ground beneath the pan bottom 11. It is preferred that the cover 20 be completely removable from the pan 10, which allows the cover 20 to be removed or applied even with a rail car in place, but hinged constructions are possible so long as they do not interfere with movement of the rail car wheels over the rail top members 103.

The invention may also be incorporated as part of a system which utilizes lateral pans or trays 40 with complete covers 41, as shown in FIG. 2. The lateral pans 40 can be provided with connector fittings 52 so that a modular construction with multiple pans 40 is possible as described above for the central pans 10.

It is contemplated that equivalents and substitutions for certain elements set forth in the embodiments above may be obvious to those skilled in the art without departing from the spirit of the invention, and therefore the true scope and definition of the invention is to be as set forth in the following claims.

We claim:

1. A hazardous liquid capture and containment device comprising a removable cover and a pan;

said pan comprising a bottom and adjoined side walls and end walls, and a drain column extending upward from said bottom, said drain column comprising a top member joined to a wall member, an open bottom and at least one aperture positioned in said wall member;

said cover comprising at least one sloping surface and a depending spout member defining a drain opening, such that with said cover positioned on top of said pan said spout member mates with said wall member of said drain column in a sealing manner to prevent passage of water into said pan, whereby water falling onto said at least one sloping surface of said cover is directed into said at least one aperture of said drain column to flow beneath said bottom of said pan.

2. The device of claim 1, where said at least one aperture in said drain column slants upward toward the interior of said drain column.

3. The device of claim 1, further comprising an annular sealing member 24 positioned within said spout member to abut said wall member of said drain column.

4. The device of claim 1, where said drain column is configured as a truncated cone.

5. The device of claim 1, where said cover is comprised of two inward sloping surfaces which meet at a center line and where said spout member and said drain opening are positioned on said center line.

6. The device of claim 1, further comprising at least one lateral opening and connector fitting positioned in at least one said end wall.

7. The device of claim 6, in combination with a second said hazardous liquid capture and containment device, where said devices are connected together by joining said connector fittings.

8. The device of claim 6, further comprising a conduit, whereby said connector fitting can be joined to said conduit for removal of hazardous liquid from said pan.

9. The device of claim 1, further comprising an apertured deck member positioned within said pan.

10. The device of claim 1, further comprising an absorbent mat member positioned within said pan.

11. The device of claim 1, wherein said pan further comprises a mating lip positioned one of said end walls.

12. The device of claim 1, wherein said pan further comprises multiple depressions positioned in said bottom.

13. A hazardous liquid capture and containment device comprising in combination a removable cover, a pan and gasket members, and adapted for use between the parallel rails of a railroad track, said rails each comprising a bottom member, a top member and a vertical member defining a generally I-shaped configuration;

said pan comprising a bottom and adjoined side walls and end walls, and a drain column extending upward from said bottom, said drain column comprising a top member joined to a wall member, an open bottom and at least one aperture positioned in said wall member;

said gasket members being disposed between said side walls and said vertical member of said rails;

said cover comprising at least a pair of inward sloping surfaces and a depending spout member defining a drain opening, such that with said cover positioned on top of said pan said spout member mates with said wall member of said drain column in a sealing manner to prevent passage of water into said pan, whereby water falling onto said sloping surfaces of said cover is directed into said at least one aperture of said drain column to flow beneath said bottom of said pan.

14. The device of claim 13, where said side walls each further comprise a longitudinal recess defining an area of reduced height for said side walls.

15. The device of claim 13, where said at least one aperture in said drain column slants upward toward the interior of said drain column.

16. The device of claim 13, further comprising a sealing member 24 positioned within said spout member to abut said wall member of said drain column.

17. The device of claim 13, where said drain column is configured as a truncated cone.

18. The device of claim 13, where said cover is comprised of two sloping surfaces which meet at a center line and where said spout member and said drain opening are positioned on said center line.

19. The device of claim 13, further comprising at least one lateral opening and connector fitting positioned in at least one said end wall.

20. The device of claim 19, in combination with a second said hazardous liquid capture and containment device, where said devices are connected together by joining said connector fittings.

21. The device of claim 19, further comprising a conduit, whereby said connector fitting can be joined to said conduit for removal of hazardous liquid from said pan.

22. The device of claim 13, further comprising an apertured deck member positioned within said pan.

23. The device of claim 13, further comprising an absorbent mat member positioned within said pan.

24. The device of claim 14, where each said recess further comprises an external lip which presses into said gasket members.

25. The device of claim 24, where said gasket members comprise an interior shoulder which rests on said recess.

26. The device of claim 13, where said gasket members are each comprised of an exterior member and an interior member.

27. The device of claim 13, wherein said pan further comprises a mating lip positioned one of said end walls.

28. The device of claim 13, wherein said pan further comprises multiple depressions positioned in said bottom.

* * * * *